United States Patent
Cleveland et al.

(10) Patent No.: US 7,020,112 B2
(45) Date of Patent: Mar. 28, 2006

(54) SYSTEM AND METHOD FOR COMBINING SIGNALS AT MULTIPLE BASE STATION RECEIVERS

(75) Inventors: Joseph R. Cleveland, Richardson, TX (US); John S. Csapo, Dallas, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 792 days.

(21) Appl. No.: 09/752,875

(22) Filed: Dec. 28, 2000

(65) Prior Publication Data

US 2002/0118665 A1    Aug. 29, 2002

(51) Int. Cl.
*H04B 7/216* (2006.01)
(52) U.S. Cl. .............. 370/335; 455/442; 455/561
(58) Field of Classification Search ........... 370/335, 370/342; 455/522, 442, 437, 561
See application file for complete search history.

(56) References Cited

U.S. PATENT DOCUMENTS

| | | | | |
|---|---|---|---|---|
| 5,884,187 A | * | 3/1999 | Ziv et al. | 455/522 |
| 5,991,627 A | * | 11/1999 | Honkasalo et al. | 455/437 |
| 6,175,747 B1 | * | 1/2001 | Tanishima et al. | 455/562.1 |
| 6,259,687 B1 | * | 7/2001 | Lomp et al. | 370/342 |
| 6,330,456 B1 | * | 12/2001 | Hashem et al. | 455/522 |
| 6,463,296 B1 | * | 10/2002 | Esmailzadeh et al. | 455/522 |
| 6,519,456 B1 | * | 2/2003 | Antonio et al. | 455/442 |
| 6,791,954 B1 | * | 9/2004 | Cheng et al. | 370/311 |

\* cited by examiner

*Primary Examiner*—Steven Nguyen
*Assistant Examiner*—Clemence Han

(57) ABSTRACT

There is disclosed a system and method wherein signals generated by a mobile station and received at multiple base transceiver stations (BTSs), are combined utilizing signal processing techniques. Signals received at non-target BTSs are directed, by each non-target BTS, to a target BTS where a combiner is utilized to assemble the received signals (bits) into a packet, or frame, and to determine if an error condition exists. The error condition of the frame or packet determines whether to utilize BTS power control circuitry to notify the mobile station to adjust the mobile station transmit power up or down.

22 Claims, 7 Drawing Sheets

SYSTEM AND METHOD FOR COMBINING SIGNALS AT MULTIPLE BASE STATION RECEIVERS

TECHNICAL FIELD OF THE INVENTION

The present invention is directed, in general, to wireless voice and data networks and, more specifically, to a system for improving reception and control of mobile stations within wireless voice and data networks.

BACKGROUND OF THE INVENTION

To establish communications with another mobile station (MS) or wireline node in a multi-cell network, each MS broadcasts a radio signal with sufficient power to meet a minimum quality of service (QoS) benchmark at the target base transceiver station (BTS) located within a radio access node (RAN). Those acquainted with the, art will recognize that a RAN consists of a base station controller and one or more base transceiver stations (see FIG. 4 and FIG. 5). In a multicell network each BTS receives signal power from the mobile stations in its own cell as well as from mobile stations in other cells (see FIG. 4 and FIG. 5). The signal power from mobile stations operating in other cells contributes to the "undesired" signal power (other MS transmission interference) at the BTS receiver input, as is known in current receiver art. In order to improve the quality of service for a specific received signal, the BTS sends a command to the MS with a weak signal to increase transmission power. This action increases the power drain on the MS battery and may increase interference at a nearby BTS because of the increase in signal power of the transmitting MS.

There is therefore a need in the art for providing a method and system to reduce the need for increased power from a MS. There is also a need to reduce interference from mobile stations at non-target base transceiver station. There is a further need to improve the signal quality of mobile stations within a cell.

SUMMARY OF THE INVENTION

To address the above-discussed deficiencies of the prior art, it is a primary object of the present invention to provide, for use in a wireless network, a distributed architecture for the reception of signals transmitted from one or more mobile stations including: 1) a plurality of base transceiver stations for receiving signals; 2) a code division multiple access detector in each base transceiver station and 3) a combiner in each base transceiver station for combining a signal received by a target base transceiver station with signals transmitted to the target base transceiver station by the plurality of base transceiver stations.

According to one embodiment of the present invention, the distributed architecture includes an encoder for producing a symbol based on an output from the CDMA detector.

In another embodiment of the present invention, the distributed architecture includes a decoder for decoding a symbol received from another non-target base transceiver station.

According to a further embodiment of the present invention, the distributed architecture includes digital signal processors (DSP), ASICs, or other similar devices, which process the signal received from the transmitting mobile station to produce a digital representation of the received signal strength. The digital representation of the received signal processed by the signal symbol processor is called a signal symbol. In exemplary embodiment of the present invention, the signal symbol processing executes in each base transceiver station capable of detecting the RF signal of the transmitting mobile station.

According to a further embodiment of the present invention, the distributed architecture includes a combiner which combines the signal symbols from one or more transmitting mobile stations. The result of symbol combining is to improve the signal to interference ratio of the detected signal transmitted by each mobile station as described herein.

According to a further embodiment of the present invention, the signal symbol provided by the encoder includes elements correlating the strength of a first signal received by a target BTS with the expected strength of the first signal.

In a further embodiment of the present invention, an error detector determines the error count of the combined signals from the target and non-target base transceiver stations.

In still another embodiment of the present invention, a reverse link power control is utilized to adjust the power of the mobile station.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
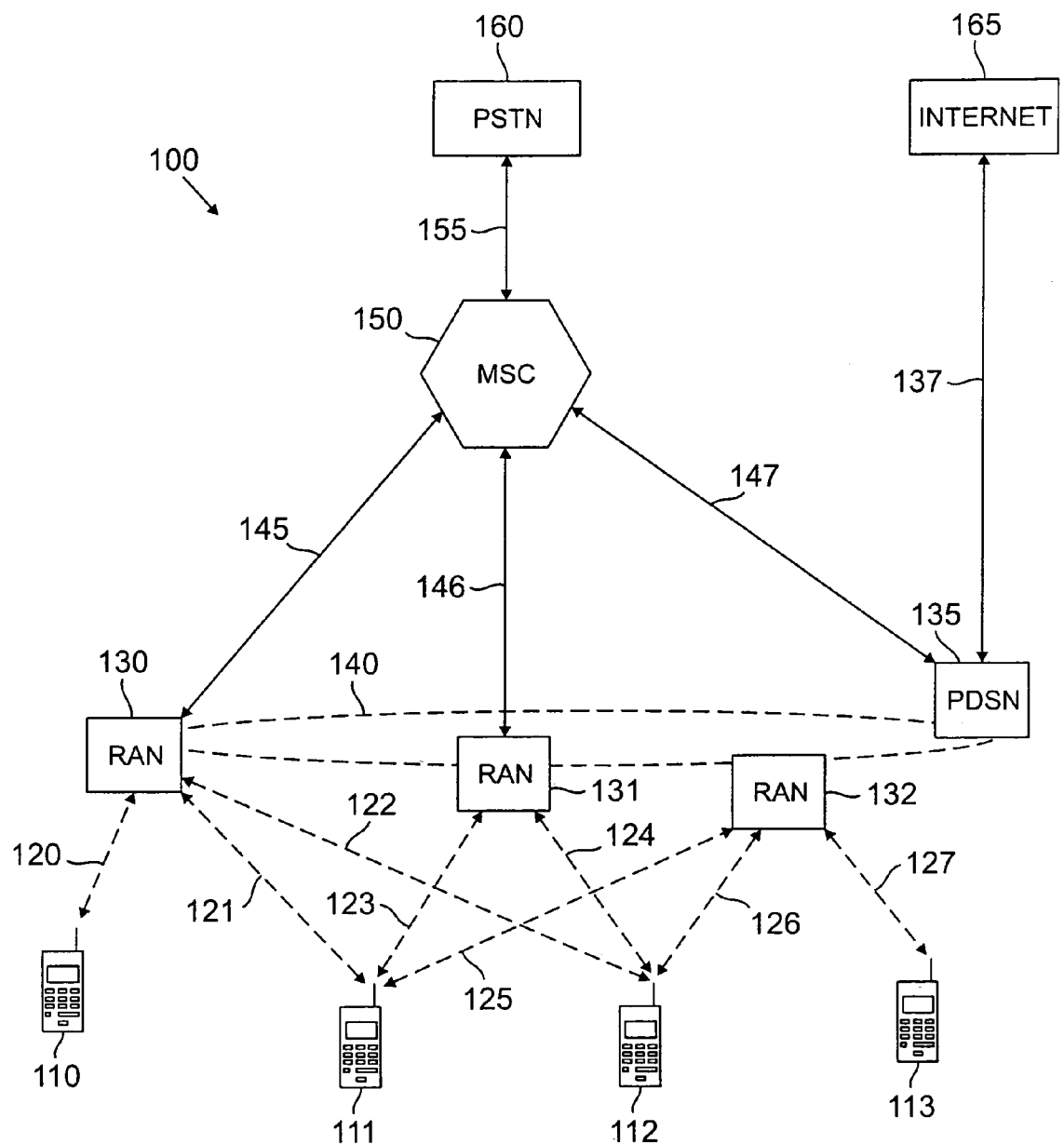
FIG. 1 illustrates a general overview of an exemplary wireless network according to an embodiment of the present invention.

FIG. 1 illustrates a general overview of exemplary wireless network 100 according to an embodiment of the present invention. Wireless network 100 comprises a plurality of mobile stations (MS) 110–113, a plurality of radio access nodes (RAN) 130–132, a mobile switching center (MSC) 150, a communications network 140, a packet data server node (PDSN) 135, and MSC-to-RAN communications links 145–147.

Mobile stations 111–113 may be any suitable wireless communication devices, including conventional cellular telephones, PCS handsets, portable computers, telemetry devices, and the like. Mobile stations 110–113 communicate with base transceiver stations in radio access nodes 130–132 across RF links 120–127. In one embodiment of the present invention a soft handoff condition exists wherein a mobile station communicates with two base transceiver stations such as for RF links 121–122 associated with MS 111 and for RF links 124–125 for MS 113.

Radio access nodes 130–132 are operable to communicate with a plurality of mobile stations 111–114. Radio access nodes 130–132 transfer voice and data signals between each other and the mobile switching center MSC 150 via communications lines 145–147. Radio access nodes 130–132 are operable with mobile switching center 150. Mobile switching center 150 is well known to this skilled in the art. Mobile switching center 150 is a circuit switching device that provides services and coordination between the subscribers in a wireless network and external networks, such as the public switching telecommunications network PSTN 160.

Communications lines 145, 146 and 147 may be any suitable connection means, including a T1 line, a T3 line, a fiber optic link, a network backbone connection, and the like. In some embodiments of the present invention, communications lines 145, 146 and 147 may be several different data links, where each data link couples one of the base station controllers (not shown) to the MSC 150.

Radio access nodes 130–132 are operable with packet data server node 135 via a communications network 140 for access to packet data services via internet, corporate intranet of similar packet data communications network. The packet data server node is well known to this skilled in the art. Packet data server node PDSN 135 is a packet routing device that provides services and coordination between the subscribers in a wireless network and external networks, such as the internet 165. In one embodiment of the present invention, the voice signals are encoded as IP packets in accordance with the H.323 standard. Voice communications over a packet data network with techniques such are well known to those skilled in the art. The PDSN 135 communicates packets to the Internet 165 via the communications line 137. Communications line 137 may be any suitable connection means, including a T1 line, a T3 line, a fiber optic link, a ethernet connection, a network backbone connection, and the like. In some embodiments of the present invention, communications line 137 may be several different data links, where each data link couples one or more packet data server nodes to the Internet 165.

Figure 2:
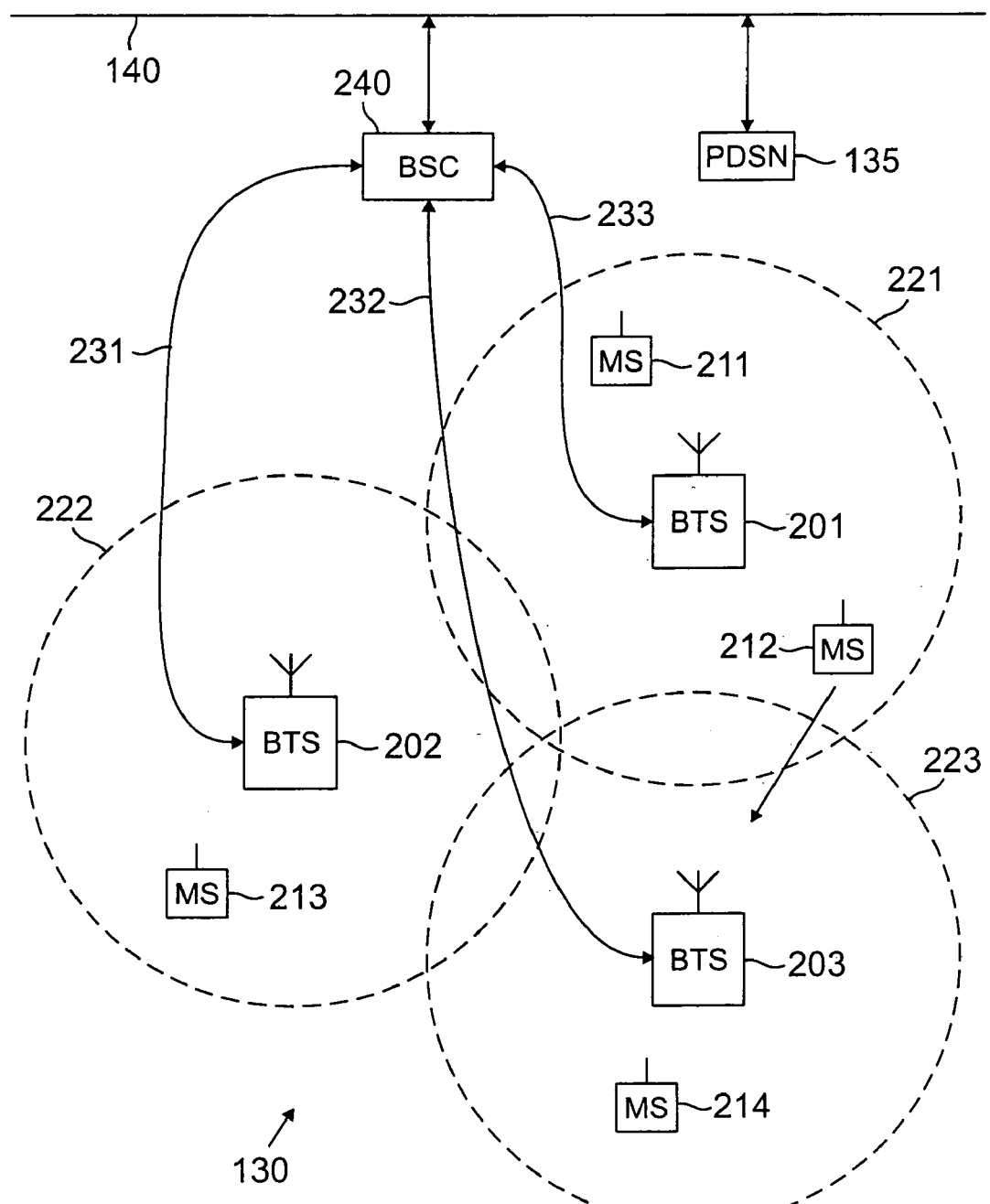
FIG. 2 depicts in greater detail an exemplary radio access node according to one embodiment of the present invention.

FIG. 2 illustrates a general overview of exemplary radio access node 200 according to an embodiment of the present invention and is representative of RAN 130, RAN 131 and RAN 132 in FIG. 1. Radio access node 200 comprises a plurality of cell sites 221–223, each containing one base transceiver station, BTS 201, BTS 202 or BTS 203. Base transceiver stations 201–203 are operable to communicate with a plurality of mobile stations 211–214. Mobile stations 211–214 may be any suitable wireless communication devices, including conventional cellular telephones, PCS handsets, portable computers, telemetry devices, and the like.

Dotted lines show the approximate boundaries of the cell sites 221–223 in which base transceiver stations 201–203 are located. The cell sites are shown approximately circular for the purposes of illustration and explanation only. It should be clearly understood that the cell sites also may have irregular shapes, depending on the cell configuration selected and both natural and man-made obstructions.

The exemplary base transceiver stations, BTS 201, BTS 202 and BTS 203, interoperate with base station controller BSC 240 via communications links 231–233 to transfer voice and data signals. Base station controller 240 is well known to this skilled in the art. Communications lines 231, 232 and 233 may be any suitable connection means, including a T1 line, a T3 line, a fiber optic link, a network backbone connection, and the like. In some embodiments of the present invention, communication lines 231, 232 and 233 may be several different data links to the BSC 240. A BSC is a device that manages wireless communications resources such as vocoders, packet data routing and base transceiver stations for specific cells within a wireless communications network.

Those skilled in the art will understand that the set of base transceiver stations may be connected to base station controllers in different configurations. In one embodiment of the present invention, each BTS may be connected to the same BSC. In a further embodiment of the present invention, each BTS may be connected to a different BSC. In another embodiment of the present invention, one or more BTS may be connected to one BSC and the remaining BTS may be connected to different BSC. In another advantageous embodiment of the present invention, the BSC is integrated in each BTS.

A base transceiver station comprises the RF transceivers, antennas, channel modems and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 221, 222, and 223 and the base station controller associated with each base transceiver station are collectively represented by BS 101, RAN 130, RAN 131 and RAN 132 in FIG. 1.

In one embodiment of the present invention, the forward link for each cell site 221–223 in FIG. 2 generally employs a pilot modulated by the cell-specific pseudorandom sequence. The pilot provides for time reference and phase and amplitude tracking for signal detection and demodulation. It also identifies newly available pilots in adjacent cells or sectors. Specifically, while a mobile station is tracking the pilot of a particular cell, it can be searching for pilots of adjacent cells using the searching mechanism of its multipath rake receiver. That is, MS 212 detects the pilot signal from BTS 201 and searches for the pilot signal from BTS 202 in adjacent cell 222 and BTS 203 in adjacent cell 223. Those skilled in the art will recognize that to make this simple and practical, all pilot pseudorandom sequences can use the same maximum length generator sequence, with different initial vectors and hence timing offsets. The relative time-offsets of pilots for neighboring cells and sectors are either known a priori or broadcast to all users of the given cell or sector on a separate CDMA channel, employing its own pseudorandom sequence or time-offset.

In one embodiment of the present invention to provide packet data services for the mobile stations 111–114, each base station controller 240, 241 and 242 connects to a packet data server node 135. In one embodiment of the present invention, communications network 140 between the RAN and the PDSN supports the IP protocol of RFC2002. Those skilled in the art will understand that the IP protocol of RFC2002 is just one of several different protocols suitable for packet data communications. Communications line 137 between PDSN 135 and the internet 165 may be any suitable connection means that supports the IP protocol of RFC2002, including a T1 line, a T3 line, an ethernet line, a network backbone connection, and the like. RAN 130, RAN 131 and RAN 132 and PDSN 135 provide the conversion from over-the-air protocols to the wire line protocols used on the internet. In the exemplary wireless network 100, MS 211 is located in cell site 221 and is in communication with BS 201, MS 213 is located in cell site 222 and is in communication with BS 202, and MS 214 is located in cell site 223 and is in communication with BS 203. MS 212 is also located in cell site 221, close to the edge of cell site 223. The direction arrow proximate MS 212 indicates the movement of MS 212 towards cell site 223. At some point, as MS 212 moves into cell site 223 and out of cell site 221, a "handoff" will occur.

At some point as MS 212 moves to transition for coverage by BS 201 to coverage by BS 203, a handoff process occurs. In one embodiment this handoff process may take the form of a hard handoff where typically BS 201 provides coverage on one frequency set and BS 202 provides coverage on a different frequency set. In another embodiment this handoff process may take the form of a CDMA soft handoff where BS 201 and BS 202 provide coverage on the same frequency set.

In soft handoff, universal frequency reuse makes it possible for mobile station to receive and send the same call simultaneously from multiple base stations. Once a new pilot is detected and found to have sufficient signal strength (usually relative to the first pilot already being tracked), the mobile will signal this event to its original base station. This in turn will notify the BSC, which enables the base station of the second cell to both send and receive the same traffic to and from the given mobile. For forward link transmission to the mobile the mobile station rake receiver demodulates transmissions from both cells in two fingers of the rake in both cell and combines them coherently, with appropriate delay adjustments. For the reverse link, normally each base station demodulates and decodes each frame or packet independently. For example, MS 212 will communicate with both BS 201 and 203. In the case of forward link or uplink reception by the mobile station, the base station signals can be combined by the mobile station to improve performance. For the reverse link, the different base stations BS 201 and 203 will normally decode the signals independently. Should each base station decode a given frame or message differently, the target BSC will decide which decoded signal to select based on a decision algorithm. Qualitatively, this feature provides more reliable handoff between base stations as a user moves from one cell to the adjacent one.

As is well known, the hard "handoff" procedure transfers control of a call from a first cell to a second cell. For example, if MS 212 is in communication with BTS 201 and senses that the signal from BTS 201 is becoming unacceptably weak, MS 112 may then switch to a BTS that has a stronger signal, such as the signal transmitted by BTS 203. MS 212 and BTS 203 establish a new communication link and a signal is sent to BTS 201 and the public telephone network to transfer the on-going voice, data, or control signals through BTS 203. The call is thereby seamlessly transferred from BTS 201 to BTS 203. An "idle" handoff is a handoff between cells of a mobile device that is communicating in the control or paging channel, rather than transmitting voice and/or data signals in the regular traffic channels.

Figure 3:
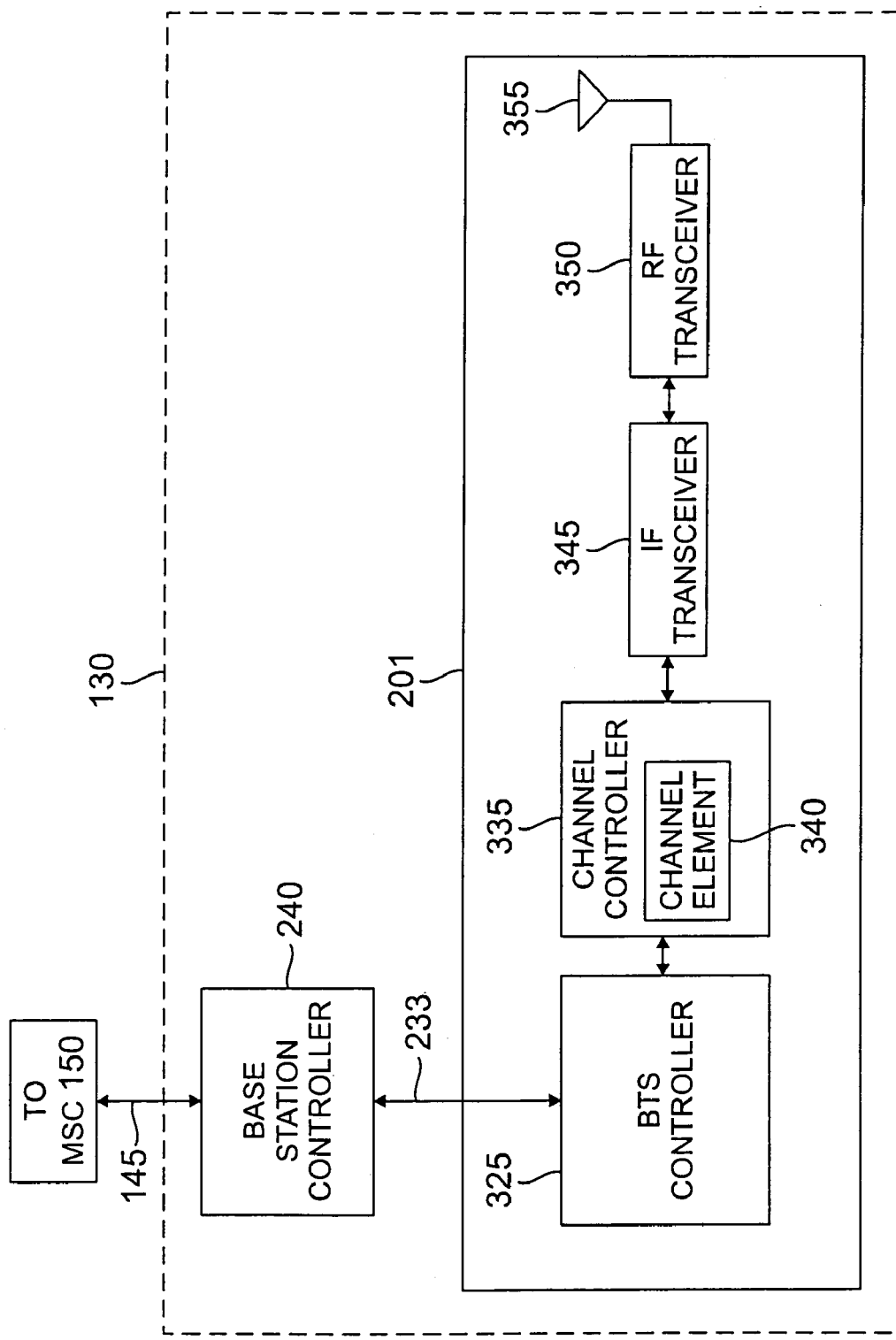
FIG. 3 depicts in greater detail an exemplary base transceiver station according to one embodiment of the present invention.

FIG. 3 depicts in greater detail exemplary radio access node 130 according to one embodiment of the present invention. Radio Access Node 130 comprises base station controller (BSC) 240 and base transceiver station (BTS) 201. Base station controllers and base transceiver stations were described previously in connection with FIG. 2. BSC 210 manages the resources in cell site 221, including BTS 201. BTS 201 comprises BTS controller 325, channel controller 335, which contains representative channel element 340, transceiver interface (IF) 345, RF transceiver unit 350 and antenna array 355.

BTS controller 325 comprises processing circuitry and memory capable of executing an operating program that controls the overall operation of BTS 201 and communicates with BSC 240. Under normal conditions, BTS controller 325 directs the operation of channel controller 335, which contains a number of channel elements, including channel element 340, that perform bi-directional communications in the forward channel and the reverse channel. A "forward" channel refers to outbound signals from the base station to the mobile station and a "reverse" channel refers to inbound signals from the mobile station to the base station. In an advantageous embodiment of the present invention, the channel elements operate according to a code division multiple access (CDMA) protocol with the mobile stations in cell 221. Transceiver IF 345 transfers the bi-directional channel signals between channel controller 340 and RF transceiver unit 350.

Antenna array 355 transmits forward channel signals from RF transceiver unit 350 to mobile stations in the coverage area of BTS 201. Antenna array 355 also sends to transceiver 350 reverse channel signals received from mobile stations in the coverage area of BTS 201. In a preferred embodiment of the present invention, antenna array 355 is multi-sector antenna, such as a three sector antenna in which each antenna sector is responsible for transmitting and receiving in a 120 degree arc of coverage area. Additionally, RF transceiver 350 may contain an antenna selection unit to select among different antennas in antenna array 355 during both transmit and receive operations.

Figure 4:
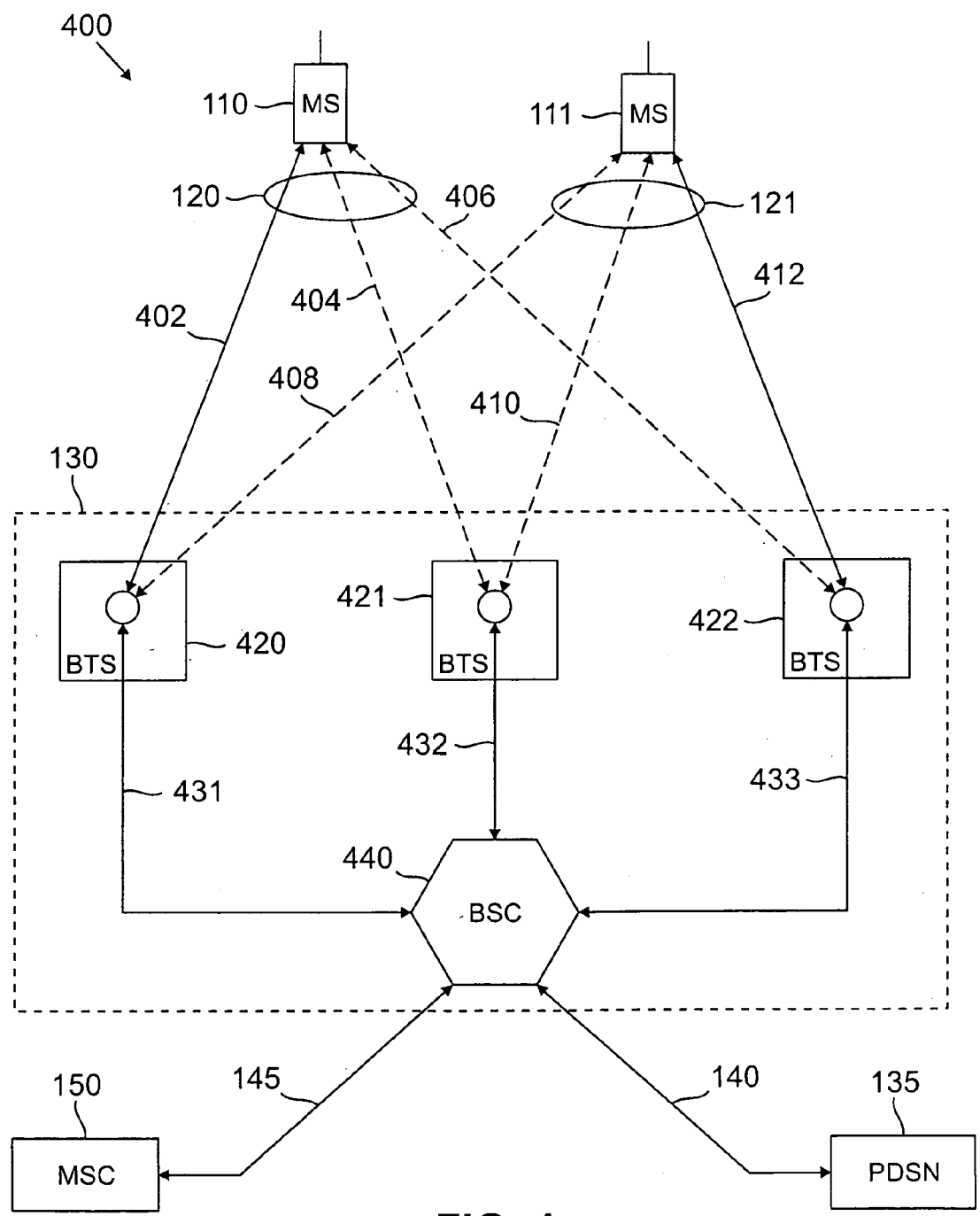
FIG. 4 illustrates a high-level block diagram of exemplary radio access node utilizing distributed architecture according to one embodiment of the present invention.

FIG. 4 depicts a distributed architecture system 400 for the reception of wireless signals, according to one embodiment of the present invention. Radio access node 130 from FIG. 1 comprises base transceiver stations (BTS) 420, 421 and 422 which communicate with mobile stations (MS) 110 and 111. MS 110 communicates with BTS 420, BTS 421 and BTS 422 in RAN 130 over RF links 402, 404 and 406, respectively. MS 111 communicates with BTS 420, BTS 421 and BTS 422 in RAN 130 over RF links 408, 410 and 412, respectively. RF communications links 402, 404 and 406 comprise a set of links for communications link 120 in FIG. 1. Likewise, RF communications links 408, 410 and 412 comprise a set of links for communications link 121 in FIG. 1. BTS 420, BTS 421 and BTS 422 communicate with base station controller 440 via communications lines 431–433. Communications lines 431–433 may be any suitable connection means, including a T1 line, a T3 line, a fiber optic link, a ethernet connection, a network backbone connection, and the like.

BSC 440 connects to the mobile switching center (MSC) 150, a call manager, (not shown) or to a packet router (not shown) through back-haul network 140. Back-haul network 145 may be any suitable connection means, including a T1 line, a T3 line, a fiber optic link, a ethernet connection, a network backbone connection, an asynchronous transmission mode (ATM) network or other network capable of transporting packet data.

BTS 420, BTS 421 and BTS 422 each provide the radio resources and the digital interface for RAN 130 for operability with MS 110 and MS 111. The radio resources include a radio transceiver RF front end and antenna to establish an RF interface with mobile station MS 110 and MS 111. BTS 420, BTS 421 and BTS 422 modulate the RF carrier frequency, for a transmitted signal, with I=Q signals from the channel modems and amplify the modulated RF signal to the transmission power level.

For a received signal, from MS 111 and MS 112, BTS 420, BTS 421 and BTS 422 perform amplification and intermediate frequency (IF) down-conversion of the carrier signals received by primary and diversity antennas (neither shown) at each BTS. For the forward, or down-link signal, a digital interface performs interleaving, encoding, modulation, filtering and phase equalization. For reverse (up-link) signals, the digital interface performs despreading, decoding, de-interleaving and demodulation.

MS 111 and MS 112 broadcast a radio signal with sufficient power to meet a minimum quality of service (QoS) metric (benchmark) at the target BTS (in this example BTS 420 is a target for MS 111 and BTS 422 is a target for MS 112). Generally the ratio of the $E_s$ energy-per-bit to total interference ($E_s/I_o$) represents this benchmark. If the wireless network includes more than one BTS, the RF signal propagates along a different path to each BTS. Signal 402 is stronger at BTS 420, dictating that BTS 420 is a target for MS 111. Signal 412 is stronger at BTS 422, dictating that BTS 422 is a target for MS 112. Signals 404 and 406 (represented by dashed lines) are the same, but weaker, signal as signal 402, and received at BTS 421 and 422, respectively. Signals 408 and 410 (represented by dashed lines) are the same, but weaker, signal as signal 412, and received at BTS 420 and 421, respectively.

Figure 5:
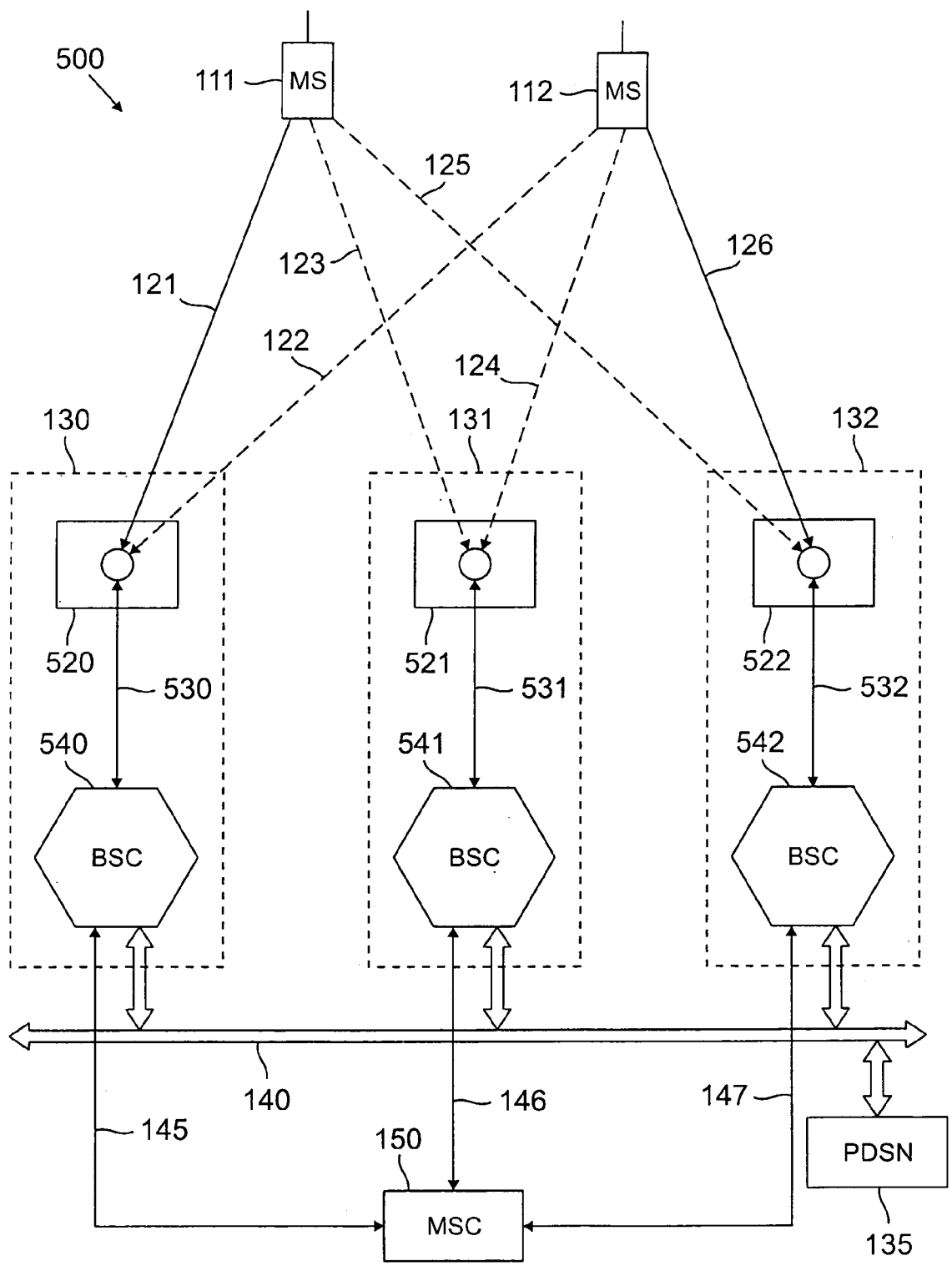
FIG. 5 illustrates a high-level block diagram of a wireless network utilizing distributed architecture that uses multiple exemplary radio access nodes according to one embodiment of the present invention.

FIG. 5 depicts an exemplary embodiment of a distributed architecture system for the reception of wireless signals, according to one embodiment of the present invention. Distributed architecture is one possible configuration of an IP-based wireless network. In one embodiment of the present invention of a distributed architecture, each radio access node (RAN) comprises one base transceiver subsystem (BTS) and one base station controller (BSC). FIG. 5 depicts RAN 130, comprising BTS 510 and BSC 540. RAN 131 comprises BTS 521 and BSC 540. RAN 132 comprises BTS 532 and BSC 542. In a centralized architecture, each base station controller may connect to one or more base transceiver stations.

Each RAN connects to mobile switching center (MSC) 150, a call manager (CM) (not shown) or to a packet router (PR) not shown) through back-haul (transmitting cellular calls between cell sites and MSC via wireline) network 140. Back-haul network 140 may consist of T1/E1 connectivity, an asynchronous transmission mode (ATM) network, an ethernet local area network (LAN) or other type of network capable of transporting packet data.

In conventional wireless services, the mobile station establishes communications through a preferred BTS, called the target BTS. The target BTS is the BTS with the strongest received signal (e.g., signal 121). All other signals received at BTS 520 contribute to interference (e.g., signal 123 at BTS 521).

BTS 520, BTS 521, and BTS 522 each provide the radio resources and the digital interface for the respective RAN 130, RAN 131 and RAN 132. The radio resources include a radio transceiver RF front-end and antenna to establish an RF interface with mobile station MS 111 and MS 112. BTS 520, BTS 521, and BTS 522 modulate the RF carrier frequency, for a transmitted signal, with I-Q signals from the channel modems and amplifies the modulated RF signal to the transmission power level.

For a received signal, from MS 111 and MS 112, BTS 520, BTS 521, and BTS 522 perform amplification and Intermediate Frequency (IF) down-conversion of the carrier signals received by the primary and diversity antennas (neither shown) at each BTS. For the forward or down link signal, a digital interface performs interleaving, encoding, modulation, filtering and phase equalization. For reverse or uplink signals, the digital interface performs demodulation, decoding and de-interleaving.

MS 111 and MS 112 broadcast a radio signal with sufficient power to meet a minimum quality of service (QoS) metric (benchmark) at a target BTS (in this example BTS 520 is a target for MS 111 and BTS 522 is a target for MS 112). Generally the ratio of N-chip symbol energy-per-bit to total interference ($E_s/I_o$) represents this benchmark. If the wireless network includes more than one BTS, the RF signal propagates along a different path to each BTS. Signal 312 is stronger at BTS 522, dictating that BTS 522 is a target BTS for MS 112. Signals 122 and 124 (represented by dashed lines) are the same, but weaker, signal as signal 126, and received at BTS 520 and BTS 521 respectively.

Signal 121 is stronger at BTS 520, dictating that BTS 121 is a target BTS of MS 111. Signals 123 and 125 (represented by dashed lines) are the same signal, but weaker, as 121 and received at BTS 521 and BTS 522 respectively.

The signals that propagate along different propagation paths, as described above for FIG. 4 and FIG. 5, are processed and combined with other signals received by the base transceiver stations. The processing invoked in the above described architecture improves the probability that the $E_s/I_o$ ratio of the target BTS signal will exceed a predetermined threshold.

Signal detection theory holds that the signal to interference ratio of a binary sequence at the input to a detector varies inversely as the number of signal samples M. The multipath component amplitudes are random variables, mutually independent because uncorrelated path attenuation is assumed for each signal. Then the error probability for perfect estimates becomes $$P_E = E[P_E(\alpha_1, \alpha_2, \alpha_3, \cdots, \alpha_M)] < E\left[\prod_{m=1}^{M} \exp(-\alpha_m^2 E_s / I_o)\right]$$

where: E[ ]=expectation value $P_E$=probability of error

αm=signal amplitude for mth path $E_s$=N-chip symbol energy $E_s/I_o$=symbol energy to interference density This expression shows that the error probability decreases with each additional signal. Those acquainted with signal detection theory will recognize that for Rayleigh-distributed attenuation components of equal strength, the upper bound for the average error probability has the form:

$$\bar{P}_E < \frac{1}{1 + [E_s/I_o]}$$

In this reference architecture one or more mobile stations communicate with one or more remote base transceiver stations, each connected to a BSC. The mobile stations may operate in either a fixed or mobile mode. In a distributed architecture, the BTS and BSC may be combined. The BSC provides the two way connectivity with other network users over a back-haul network through switching or routing facilities, such as the MSC, CM or PR. For voice traffic a BSC provides any vocoding conversions between the wireless system air interface and the wireline interface. For link layer and network layer connectivity, the back-haul network may use Internet Protocol (IP), ATM or other packet protocol.

In the present invention, each BTS that receives a signal from a transmitting MS processes the received signal and sends processed or encoded information to the target BTS for additional processing. By combining the signals received at multiple base transceiver stations, a larger $E_b/I_o$ ratio results. It is then possible to reduce the transmit power of the transmitting MS, through reverse link power control over the air interface, to the minimum required to sustain the QoS. This reduces power drain on the MS battery and lowers the interference on the reverse link at each BTS. Essentially, with the present invention, there is no interference from mobile stations, only additional signals that are redirected.

Figure 6:
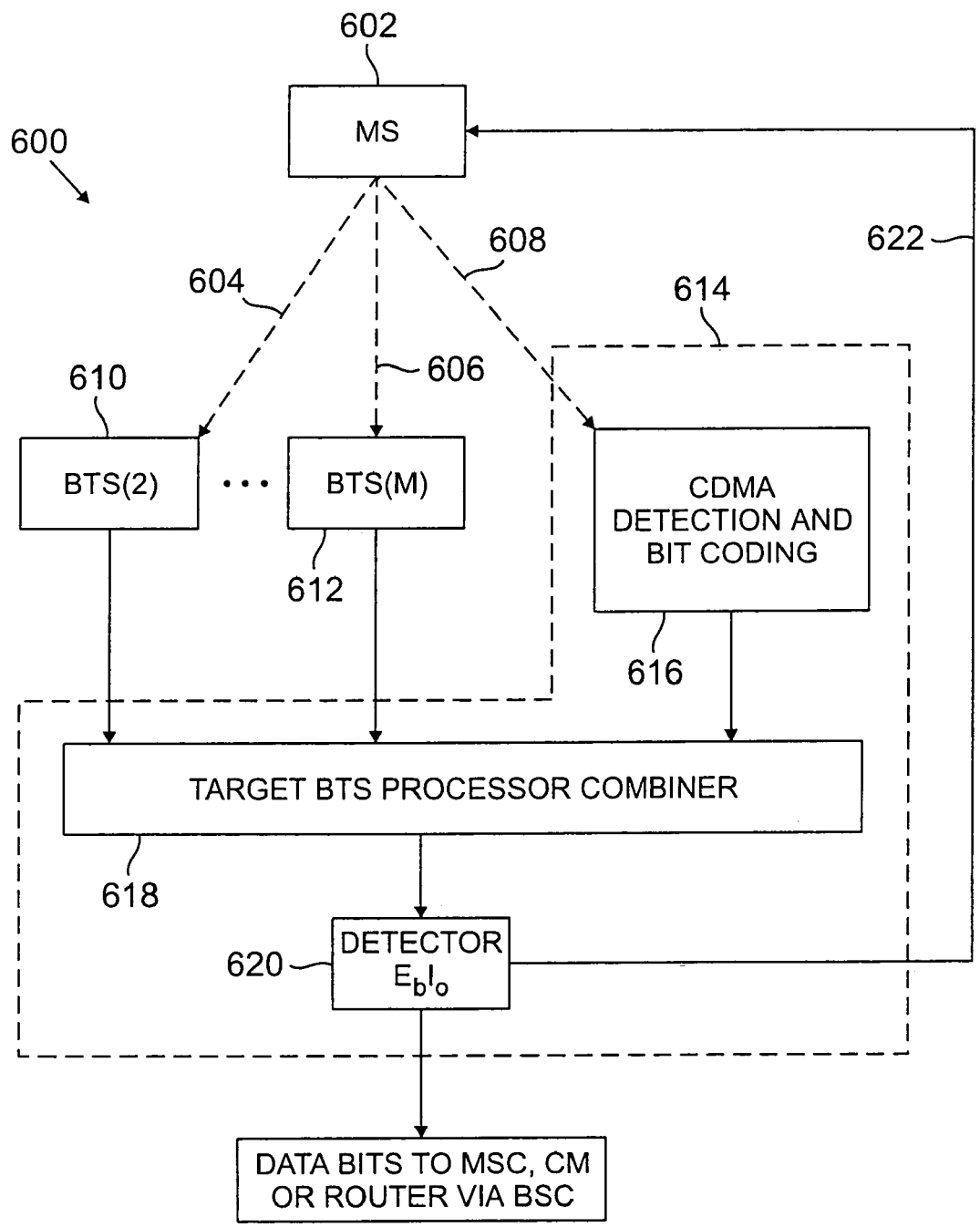
FIG. 6 depicts a high-level block diagram of a base transceiver station in accordance with one embodiment of the present invention.

FIG. 6 depicts a high-level block diagram for processing up-link (reverse channel) signals received by a base transceiver station in accordance with one embodiment of the present invention is depicted. BTS(2) 610 and BTS(1) 614 perform amplification and IF down-conversion for a received RF signal. BTS(1)RX 614 is a more detailed representation of a BTS and the BTS functions in accordance with a preferred embodiment of the present invention. There are more Base station transceivers receiving signals in the network and are represented by BTS(2) through BTS(M) each receiving signals 604 and 606, respectively, from MS 402.

In BTS(1) 614, CDMA detector 616 performs demodulation, decoding and de-interleaving of received CDMA baseband signal 608. In one embodiment of the invention the detector may employ a de-correlator to determine the level of correlation of the received signal with the expected code pattern. In another embodiment of the present invention, the detector may employ a matched filter to detect the received signal. The target BTS, BTS(1) 614, sends a code pattern for each detected transmitting MS, to each BTS in the network.

BTS(1) 614 provides a code pattern for the MS 602 signal by producing a symbol (a recognizable electrical state) based on CDMA detector/coder 616 output according to the strength of the correlation between the received signal and the expected signal. Within the network, BTS(2) 610 through BTS(M) 612, that are not the target of the transmitting MS, sends the retrieved and encoded signal to the target BTS. In BTS(1) 614, a received non-targeted signal is coded and transmitted to the target BTS.

BTS(1) 614 receives each encoded symbol from each of the non-targeted base transceiver stations and processes the symbols with the targeted signal received and processed by CDMA detector 616 for a combined signal. A decoder (not shown) determines the bit pattern of each symbol transmitted by the other base transceiver stations to match all the received signals. The matching signals are then sent to Target BTS Processor combiner 618, which assembles all the received bits (signals) into a packet or frame. The combined packet or frame is then sent to detector 620 which determines the frame or packet condition based on error checking coding and notifies BTS(1) 614 power control circuitry to send a signal 622 to MS 602 to adjust power. If the frame or packet error rate is greater than a predetermined maximum error threshold, the power control circuitry notifies MS 602 to increase transmit power. If the frame or packet error rate is less than a minimum error rate, the power control circuitry notifies MS 602 to reduce power.

Figure 7:
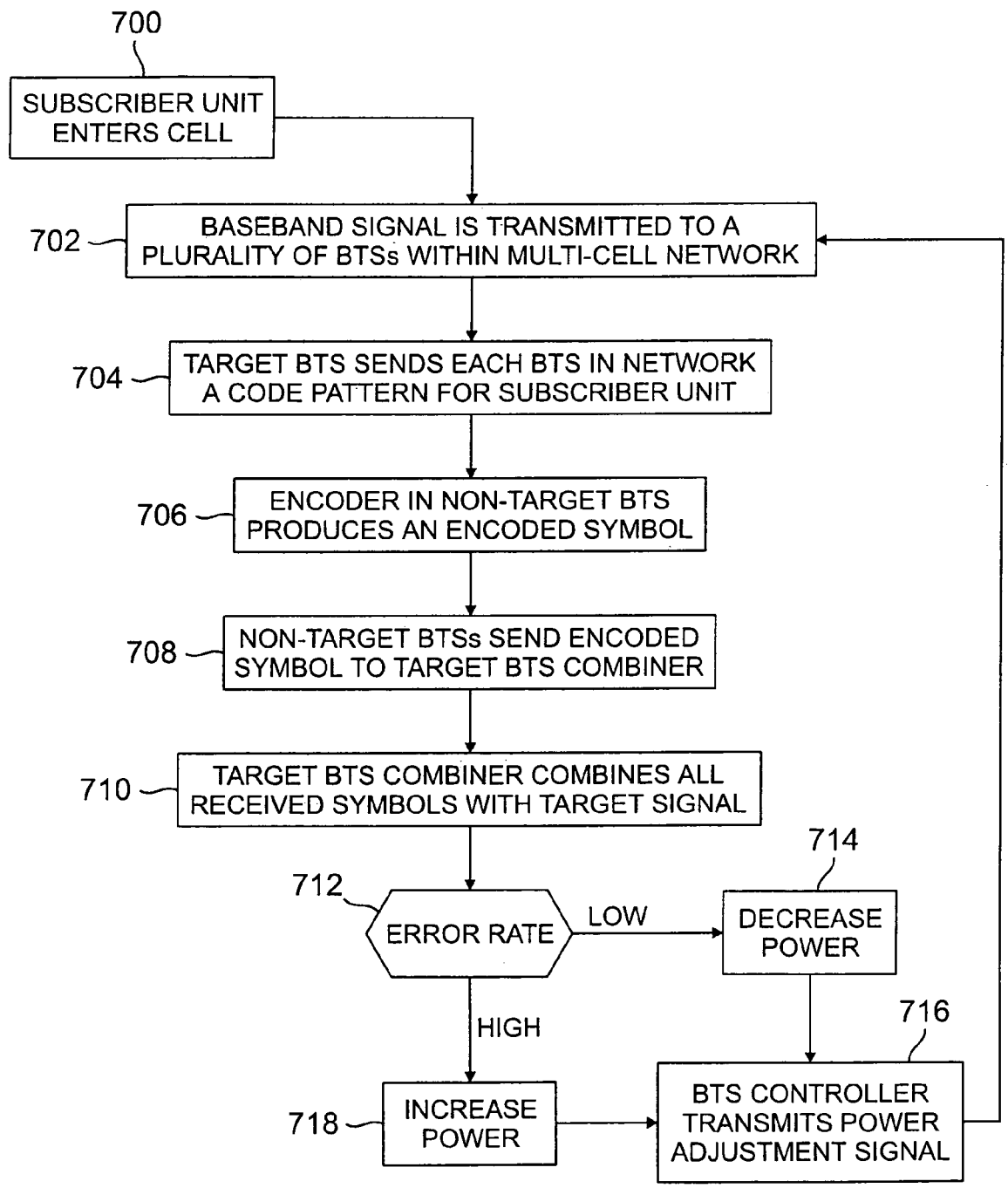
FIG. 7 illustrates a flow diagram of a method for utilizing distributed detection of signals transmitted by a mobile station in accordance with one embodiment of the present invention.

FIG. 7 illustrates a flow diagram of a method for utilizing distributed detection of signals, transmitted by a mobile station, in accordance with one embodiment of the present invention. A mobile station is depicted entering a cell within a multi-cell network (process step 700). A baseband signal from the subject mobile station is transmitted to a plurality of base transceiver stations within the network (process step 702). One BTS, usually the BTS nearest the mobile station, is the target BTS which receives the strongest signal from the mobile station.

The target BTS identifies the mobile station and sends a code pattern of the mobile station signal to every other BTS in the network (process step 704). An encoder in a non-target BTS producing an encoded symbol of the signal received from the mobile station (process step 706). The signal received in a non-target BTS is considered interference in prior art systems but, in the present invention, the signal is utilized to strengthen the MS signal in the target BTS.

Non-target Base station transceivers send the encoded symbol of the received transmission from the mobile station to the target BTS (process step 708). The target BTS combiner receives the transmission from the mobile station and the encoded symbols from the non-target Base station transceivers (process step 710). The combiner then assembles all the received signals into a packet or frame.

A determination is made of whether the error condition of the frame or packet is high or low (process step 712). If the error condition is low, the signal, including the combined signals from the non-target Base station transceivers, may strong enough. The target BTS controller prepares a power adjustment signal to the mobile station to decrease MS signal power (process step 714). The BTS controller sends the decrease power signal to the mobile station (process step 716). Returning to step 712, if the error condition rate is high, the combined signals are too weak and the target BTS controller, instead, prepares a power adjustment signal to the mobile station to increase unit signal power (process step 718). The BTS controller then sends the increase power signal to the mobile station (process step 716). The process then continues to step 702 where the process is repeated.

Although the present invention has been described in detail, those skilled in the art should understand that they can make various changes, substitutions and alterations herein without departing from the spirit and scope of the invention in its broadest form.

What is claimed is:

1. For use in a wireless network, a distributed architecture for the reception of signals transmitted from one or more mobile stations, comprising:
    a plurality of base transceiver stations for receiving said signals;
    a Code Division Multiple Access (CDMA) detector in each said base transceiver station, producing a symbol based on a baseband signal received from a first mobile station; and
    a combiner in a target base transceiver station for combining a first signal received from said first mobile station by said target base transceiver station with symbols sent to said target base transceiver station by non-target ones of said plurality of base transceiver stations.

2. The distributed architecture as set forth in claim 1 further comprising an error detector in each said base transceiver station for determining an error count when said first signal received from said first mobile station and said symbols sent to said target base transceiver station by said non-target base transceiver stations are combined.

3. The distributed architecture as set forth in claim 2, further comprising a reverse link power control for notifying said mobile station to increase power if said error count is high.

4. The distributed architecture as set forth in claim 2, further comprising a reverse link power control for notifying said mobile station to decrease power if said error count is low.

5. A wireless office network, comprising:
    a mobile switching center;
    a plurality of base stations each comprising a base station controller and at least one base transceiver station;
    a backhaul network for connecting said mobile switching center with each said base station; and
    a distributed architecture for the reception of signals transmitted from one or more mobile stations, comprising:
        a plurality of base transceiver stations for receiving said signals;
        a Code Division Multiple Access (CDMA) detector in each of said plurality of base transceiver stations, producing a symbol based on a baseband signal received from a first mobile station; and
        a combiner in a target base transceiver station for combining a first signal received from said first mobile station by said target base transceiver station with symbols sent to said target base transceiver station by non-target ones of said plurality of base transceiver stations.

6. The wireless office network as set forth in claim 5 further comprising an error detector in each said base transceiver station for determining an error count when said first signal received from said first mobile station and said symbols sent to said target base transceiver station by said non-target base transceiver stations are combined.

7. The wireless office network as set forth in claim 6, further comprising a reverse link power control for notifying said mobile station to increase power if said error count is high.

8. The wireless office network as set forth in claim 6, further comprising a reverse link power control for notifying said mobile station to decrease power if said error count is low.

9. For use in a wireless network, a method for receiving signals transmitted from one or more mobile stations, comprising the steps of:
    detecting a baseband signal from a mobile station at a plurality of base transceiver stations, one station being a target base transceiver station;
    producing a symbol based on a detector output determined from said baseband signal received at each non-target base transceiver station;
    combining said non-target base transceiver station symbols with said baseband signal received at said target base transceiver station; and
    sending a power adjustment signal to said mobile station.

10. The method as set forth in claim 9, further comprising the step of:
    sending a code pattern for said mobile station to each non-target base transceiver station in said network.

11. The method as set forth in claim 9, further comprising the step of:
    sending said symbol from each said non-target base transceiver station to said target base transceiver station.

12. The method as set forth in claim 9, further comprising:
    decoding said symbols received from each said non-target base transceiver station.

13. The method as set forth in claim 9, further comprising:
    responsive to a high error count, prompting said mobile station to increase power.

14. The method as set forth in claim 9, further comprising the step of:
    responsive to a low error count, prompting said mobile station to decrease power.

15. For use in a wireless network comprising a plurality of base transceiver stations capable of communicating with mobile stations accessing said wireless network, a first base transceiver station comprising:
    a Code Division Multiple Access (CDMA) detector capable of receiving first CDMA signals transmitted by a first one of said mobile stations; and
    a combiner capable of combining said first CDMA signals with symbols sent to said first base transceiver station from a second base transceiver station, said symbols based on a baseband signal received at said second base transceiver station from said first one of said mobile stations.

16. The first base transceiver station as set forth in claim 15, further comprising an error detector capable of receiving a combined output signal from said combiner and outputting an error value corresponding to a number of errors detected in said combined output signal.

17. The first base transceiver station as set forth in claim 16, further comprising power control circuitry capable of receiving said error value from said error detector and generating a power adjustment signal for transmission to said first mobile station.

18. The first base transceiver station as set forth in claim 7, wherein said power control circuitry compares said error value to a threshold value and determines said power adjustment signal based on said comparison.

19. A wireless network comprising:
   a plurality of base transceiver stations capable of communicating with mobile stations accessing said wireless network, wherein a first one of said plurality of base transceiver stations comprises:
      a Code Division Multiple Access (CDMA) detector capable of receiving first CDMA signals transmitted by a first one of said mobile stations; and
      a combiner capable of combining said first CDMA signals with symbols sent to said first base transceiver station from a second one of said plurality of base transceiver stations, said symbols based on a baseband signal received at said second one of said plurality of base transceiver stations from said first one of said mobile stations.

20. The wireless network as set forth in claim 19, further comprising an error detector capable of receiving a combined output signal from said combiner and outputting an error value corresponding to a number of errors detected in said combined output signal.

21. The wireless network as set forth in claim 20, further comprising power control circuitry capable of receiving said error value from said error detector and generating a power adjustment signal for transmission to said first mobile station.

22. The wireless network as set forth in claim 21, wherein said power control circuitry compares said error value to a threshold value and determines said power adjustment signal based on said comparison.

* * * * *

UNITED STATES PATENT AND TRADEMARK OFFICE
CERTIFICATE OF CORRECTION

PATENT NO. : 7,020,112 B2
APPLICATION NO. : 09/752875
DATED : March 28, 2006
INVENTOR(S) : Joseph R. Cleveland and John S. Csapo It is certified that error appears in the above-identified patent and that said Letters Patent is hereby corrected as shown below:

Column 3, line 58, delete "this" and replace with --those--;

Column 4, line 7, delete "this" and replace with --those--;

Column 4, line 47, delete "this" and replace with --those--;

Column 13, claim 18, line 15, delete "claim 7" and replace with --claim 17--.

Signed and Sealed this

Twenty-second Day of May, 2007

JON W. DUDAS
*Director of the United States Patent and Trademark Office*